(No Model.) 2 Sheets—Sheet 1.

J. C. W. JEFFERYS.
BUTTON OR OTHER ANALOGOUS ARTICLE.

No. 350,491. Patented Oct. 12, 1886.

WITNESSES.
Walter A. Barlow
A. J. Bickmore

INVENTOR.
J. C. W. Jefferys (No Model.) 2 Sheets—Sheet 2.
J. C. W. JEFFERYS.
BUTTON OR OTHER ANALOGOUS ARTICLE.
No. 350,491. Patented Oct. 12, 1886.

Figure 10:
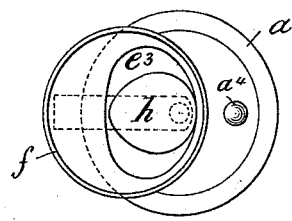
Figure 11:
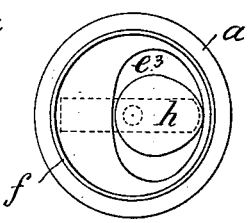
Figure 16:
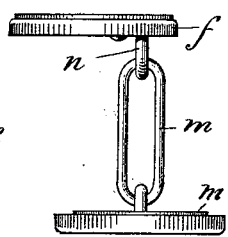
Figure 17:
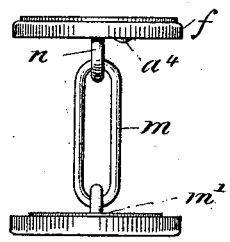

FIG. 16ᴬ 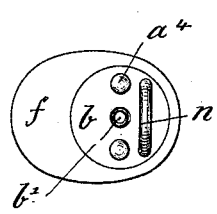
FIG. 17ᴬ 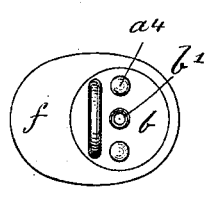
FIG. 10ᴬ 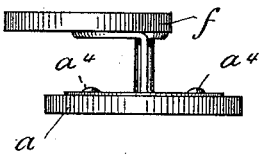
FIG. 11ᴬ 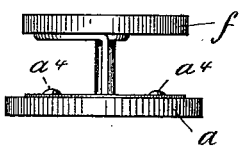

Figure 15:
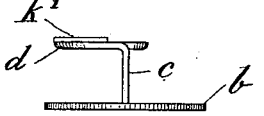
Figure 14:
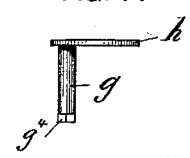
Figure 19:
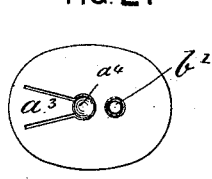

FIG. 15ᴮ 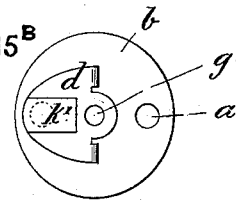
FIG. 14ᴬ 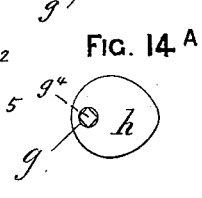
FIG. 19ᴬ 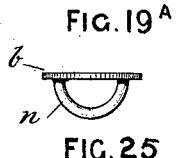

FIG. 15ᴬ 

WITNESSES
Walter A. Barlow
A. J. Bickmore
INVENTOR
J. C. W. Jefferys

UNITED STATES PATENT OFFICE.

JOHN COMPTON WEEKS JEFFERYS, OF HARGRAVE PARK ROAD, HOLLOWAY, COUNTY OF MIDDLESEX, ENGLAND.

BUTTON OR OTHER ANALOGOUS ARTICLE.

SPECIFICATION forming part of Letters Patent No. 350,491, dated October 12, 1886.

Application filed February 15, 1886. Serial No. 191,984. (No model.) Patented in England June 22, 1885, No. 7,574.

*To all whom it may concern:*

Be it known that I, JOHN COMPTON WEEKS JEFFERYS, of Hargrave Park Road, Holloway, in the county of Middlesex, England, have invented a new and useful Improvement in Buttons, Solitaires, Sleeve-Links, and such like Articles, (for which I have obtained Letters Patent in Great Britain, No. 7,574, bearing date June 22, 1884,) of which the following is a specification, reference being had to the accompanying sheets of drawings, and to the figures and letters marked thereon—that is to say:

This invention relates to further improvements upon the subject-matter of Letters Patent No. 170,744, dated November 11, 1885, granted to me; and has for its object to place the center post of the stud, solitaire, or link to one side of the foot-plate of said stud, solitaire, or link, while the said plate is to be passed into or to be removed from the buttonhole, and then by turning the foot-plate, by turning the head, the center post may be brought central with the foot-plate, and this is effected by an arrangement of an eccentric moving plate, combined with the flat posts of the stud, solitaire, or link, and working within the foot-plate.

The invention is illustrated in the accompanying two sheets of drawings.

Figure 3:
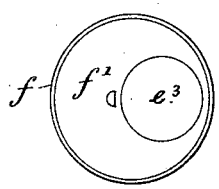
Figure 1:
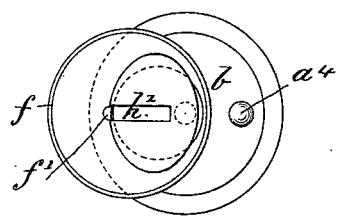
Figure 2:
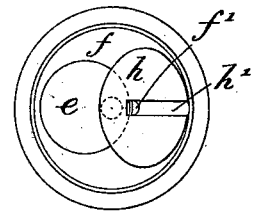
Figure 3A:
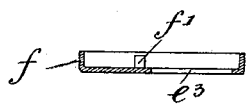
Figure 1A:
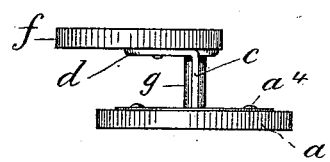
Figure 2A:
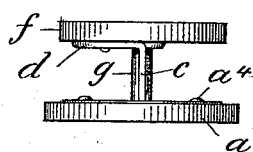

Figure 1 of Sheet 1 is an under plan view of stud in position for inserting the foot-plate within the button-hole, (the back covering of the foot-plate being removed to show the operating parts.) Fig. $1^A$ is a side view of Fig. 1, and Fig. $1^B$ is a cross-section thereof. Fig. 2 is an under plan view similar to Fig. 1, but with the parts in central position, as when the stud or solitaire is in locked position in the button-hole. Fig. $2^A$ is a front view of Fig. 2, and Fig. $2^B$ is a view of the stud from left hand of Figs. 2, $2^B$. Figs. 3, $3^A$, 4, $4^A$, 5, $5^A$, 6, $6^A$, $6^B$, 7, 8, and 9 are details of parts.

Figures 4, 5:
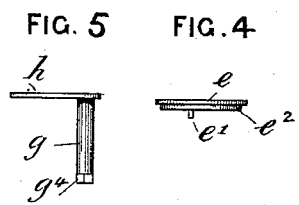
Figure 1B:
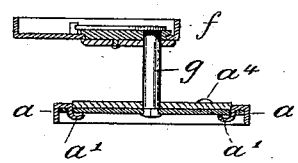
Figure 2B:
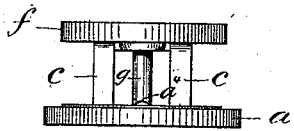
Figure 4A:
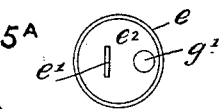
Figure 5A:
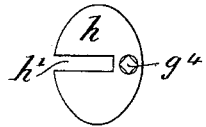
Figure 6:
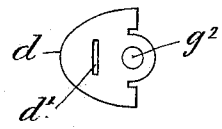
Figure 7:
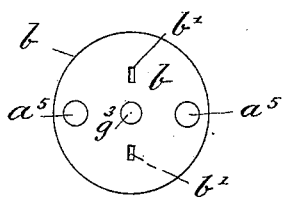
Figure 8:
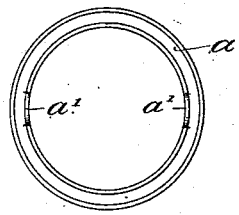
Figures 6A, 6B:
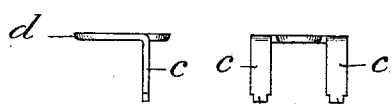
Figure 9:
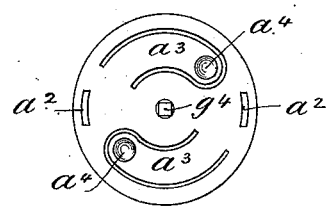

$a$ is the head of the stud, formed of the rim, Fig. 8, said rim having ears $a'$, which take into corresponding slots, $a^2$, of a spring-plate, Fig. 9, the spring-fingers $a^3$ whereof terminate in lumps $a^4$. Below the spring-plate, Fig. 9, is a plate, $b$, Fig. 7, with holes $a^5$, corresponding to the lumps $a^4$ of the spring-fingers $a^3$. Slots $b'$ of plate $b$ receive the ends $b^2$ of flat posts $c$, and the ends $b^2$ are riveted into the slots $b'$ of plate $b$. The opposite ends of the flat posts form part of a shoe-plate, $d$, of the flat posts $c$, Figs. 6, $6^A$, $6^B$. The shoe-plate $d$ has a slot, $d'$, therein, which receives a lug, $e'$, of a plate, $e$, Figs. 4 and $4^A$, said plate $e$ fitting by its smaller part, $e^2$, Fig. 4, in a circular piercing, $e^3$, of a rim-plate, $f$, (said plate $f$ being the rim of the foot of the stud, Figs. 3, $3^A$.) The rim-plate $f$ has therein a fixed crank-stud, $f'$, for purpose to be further described. There is a central round pillar, $g$, which carries a crank-plate, $h$, with a slot, $h'$, therein, Figs. 5, $5^A$, 1, and 2, said slot $h'$ engaging with the crank-stud $f''$. The holes $g'$ of plate $e$, $g^2$ of plate $d$, and $g^3$ of plate $b$ receive, successively, the central round pillar $g$, through which said holes $g'$, $g^2$, and $g^3$ the said pillar is passed, and the end $g^4$ of the said pillar $g$ is secured to the spring-plate, Fig. 9, of the rim, Fig. 8, by riveting, solder, or screw, as desirable. Any covering or ornamentation required, whether pearl, jet, ivory, stone, or precious metal, &c., for forming the head of the stud will be secured in the rim $a$, Fig. 8.

The parts are shown in juxtaposition by the section, Fig. $1^B$, and the operation of the same is as follows: Taking the stud as in position shown by Figs. 1, $1^A$, and $1^B$, the foot of the stud $f$ will be passed into the button-hole, and the flat posts $c$ will lie in the said button-hole and bear against the sides thereof. The head $a$ will then be turned to bring the stud into position shown by Figs. 2, $2^A$, and $2^B$, so as to secure the stud in the button-hole. Upon turning the head $a$ the round pillar $g$ will commence to turn by reason of its attachment to the spring-plate, Fig. 9, the flat posts $c$ remaining stationary by reason of their bearing against the sides of the button-hole, and with them the plate $b$ will remain stationary. Along with the turning of the head and round pillar $g$ the plate $h$ will be moved around, and by the crank-slot $h'$ acting upon stud $f'$ of foot-plate $f$ said foot-plate $f$ will be moved around the plate $e$, which plate $e$ is mounted eccentrically by hole $g'$ on the round pillar $g$. The stud $f'$ during this turning process will play along the crank-slot $h'$ of crank-plate $h$. The lumps $a^4$ of the spring-plate, Fig. 9, fall into the holes $a^5$ of plate $b$ when the stud or solitaire attains to either the open or closed position, and a click-sound of the spring indicates this.

Figure 12:
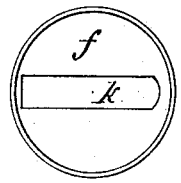
Figure 13:
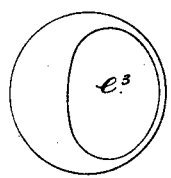

A modification is shown in Figs. 10 to 15$^B$, Sheet 2, wherein the eccentric movement of the stud from open to closed position (see Figs. 10 and 10$^A$ and 11 and 11$^A$) is effected by a cam movement, instead of by crank $h\,h'$ and stud $f'$. Figs. 10 and 10$^A$, Sheet 2, is plan and side view of this modified construction of stud or solitaire, same being shown in position for inserting in the button-hole, and the backing of the foot-plate, Fig. 10, is removed to show the parts. Fig. 11 is a plan view similar to Fig. 10, and Fig. 11$^A$ is a side view of Fig. 11, showing position of parts as when the stud or solitaire is secured in position for use. Figs. 12, 13, 14, 14$^A$, 15, 15$^A$, and 15$^B$ are details of parts. In this construction the head $a$, the spring-plate and plate $b$, and flat posts $c$, and rim $f$, and center pillar, $g$, are substantially the same as before described; but in applying the cam $h$, which is attached to the center pillar, $g$, the said cam $h$ replaces the crank-plate $h\,h'$, before described, and shown in Figs. 1, 2, 5, and 5$^A$. The plate, Fig. 13, serves as the cam-path $e^3$, and is laid into the rim $f$ of the foot-plate, Fig. 12, of the stud or solitaire—that is, plate, Fig. 13, is laid into and upon the rim and plate, Fig. 12. The plate, Fig. 12, has a slot, $k$, therein, and the guide-piece $k'$, Figs. 15, 15$^A$, and 15$^B$, enters into and is capable of movement to and fro in the slot $k$. The pillar $g$ is secured to the spring-plate, as before, and passes through center hole, $g^2$, of plate $d$, and through the center hole of plate $b$.

The operation of the parts is substantially the same as before described—that is, when the foot-plate $f$ is introduced into the button-hole the head $a$ will be turned half-way around, carrying with it the cam $h$. This cam $h$ acts upon the cam-path $e^3$, and actuates the foot-plate $f$ along with it. Now, the flat post $c$ is stationary in the button-hole, and consequently the guide-piece $k'$ is stationary; therefore is it that the slot $k$ is provided to accommodate the back-and-forth movement of the plate $f$, driven by the cam $h$, in assuming the different positions from "open" to "locked."

Figure 18:
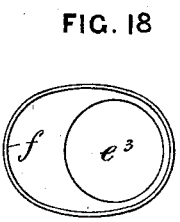
Figure 20:
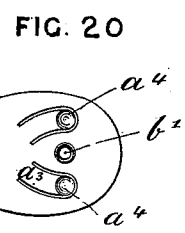
Figure 21:
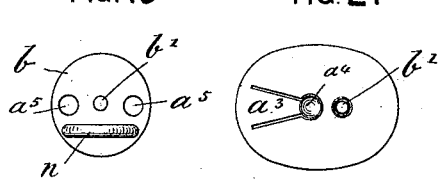
Figure 22:
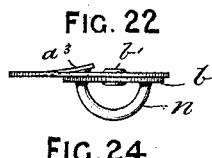

Figs. 16 and 17 show the invention applied to a sleeve-link, Figs. 18, 19, 19$^A$, and 20, 21, and 22 showing details of parts. The Figs. 21 and 22 show the spring-plate, Fig. 20, with a single spring-finger, instead of two spring-fingers. In this modification the link $m$ and piece $m'$ are substantially as ordinarily and secured to the eye $n$, which piece $n$ will occupy position in the button-hole similarly to the flat post $c$, of the preceding construction. The eye $n$ is a fixture to the plate $b$, and said plate $b$ is attached by rivet $b'$ to the spring-plate, Fig. 20 or Figs. 21 and 22, said spring-plate being free to turn upon plate $b$. The spring-plate is laid into the rim $f$, Fig. 18, and the plate $b$ lies in the opening $e^3$, and the spring-plate and rim $f$, forming the second head $f$ of the sleeve-link, is free to be turned around upon the plate $b$, which plate $b$, by its flat eye $n$, is stationary in the button-hole. It will be observed that the eccentric movement whereby the position of the center pillar (in this case the eye $n$) is changed from the central position, Fig. 17, to the edge position, Fig. 16, (that is, the "open" and "closed" positions,) of the link for purpose of readily introducing the plate $f$ into the button-hole by one sidewise movement is maintained in this construction as well as in the case of the foregoing modifications.

Figure 23:
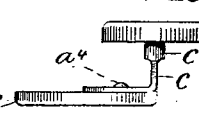
Figure 25:
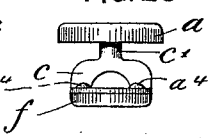
Figure 24:
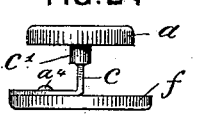

The button, stud, or solitaire shown in Figs. 23, 24, and 25 is constructed with spring-plate similarly to the head $f$ and attachments last described, with the exception only that the head $a$ is a fixture (not by link $m$) to the flat post $c$, and that the flat post $c$ has a round continuation-piece, $c'$, for the case where two button-holes cross each other, as in a shirt-front. In these last two cases the plate $f$ will be turned around after introduction into the button-hole, instead of being turned around by the action of the head $a$, as in the first two cases; but the eccentric "open" position and central "closed" position are maintained.

Having now described the nature and particulars of my said invention in such wise that the same may be readily understood and carried into practical effect, I claim—

In a button or other analogous article, the combination, with the central pillar and foot-plate, of the laterally-movable head provided with means, substantially as shown and described, whereby the pillar and foot-plate are placed in eccentric position relative to the head and returned into a locked central position, all substantially as set forth.

In testimony whereof I have hereunto set my hand in the presence of two subscribing witnesses.

JOHN COMPTON WEEKS JEFFERYS.

Witnesses:
 WALTER A. BARLOW,
 A. I. BICKMORE.